United States Patent
Foster et al.

(10) Patent No.: US 9,906,610 B1
(45) Date of Patent: Feb. 27, 2018

(54) EVENT-BASED MEDIA SHARING

(71) Applicant: Fotoccasion, Inc, Cardiff By The Sea, CA (US)

(72) Inventors: Steven Foster, Cardiff by the Sea, CA (US); Donald McCormick, Cardiff by the Sea, CA (US)

(73) Assignee: Fotoccasion, Inc, Carlsbad, CA (US)

(*) Notice: Subject to any disclaimer, the term of this patent is extended or adjusted under 35 U.S.C. 154(b) by 0 days.

(21) Appl. No.: 15/255,061

(22) Filed: Sep. 1, 2016

(51) Int. Cl.
| | |
|---|---|
| *H04L 29/08* | (2006.01) |
| *H04L 29/06* | (2006.01) |
| *G06K 9/00* | (2006.01) |
| *G06F 17/30* | (2006.01) |
| *H04W 84/12* | (2009.01) |
| *H04W 88/02* | (2009.01) |

(52) U.S. Cl.
CPC ........ *H04L 67/18* (2013.01); *G06F 17/30247* (2013.01); *G06F 17/30268* (2013.01); *G06K 9/00677* (2013.01); *H04L 65/403* (2013.01); *H04L 65/4023* (2013.01); *H04L 67/20* (2013.01); *H04L 67/22* (2013.01); *H04L 67/24* (2013.01); *H04W 84/12* (2013.01); *H04W 88/02* (2013.01)

(58) Field of Classification Search
CPC ..... H04L 65/4023; H04L 67/06; H04L 67/14; H04L 67/22; H04L 67/18; H04L 67/20; H04L 67/24; H04L 65/403; G06F 17/3087; G06F 17/30268; G06F 17/30247; G06Q 50/01
See application file for complete search history.

(56) References Cited

U.S. PATENT DOCUMENTS

| | | | | |
|---|---|---|---|---|
| 8,478,716 B2* | 7/2013 | Flinn | ................. | G06F 17/30699 707/603 |
| 8,943,140 B1* | 1/2015 | Kothari | ................. | H04L 65/403 709/203 |
| 9,043,329 B1* | 5/2015 | Patton | ............... | G06F 17/30268 707/740 |
| 9,137,281 B2* | 9/2015 | Warrick | ............. | H04L 65/4084 |
| 9,172,733 B2* | 10/2015 | Warrick | ................ | H04L 65/105 |
| 9,342,817 B2* | 5/2016 | Elliott | | |
| 9,407,709 B2* | 8/2016 | Zamer | ...................... | H04L 67/22 |
| 9,544,379 B2* | 1/2017 | Gauglitz | ................ | H04L 67/22 |
| 9,591,039 B2* | 3/2017 | O'Brien | ................ | H04L 67/18 |
| 9,674,692 B2* | 6/2017 | Quiros | ................. | H04W 8/183 |
| 2010/0002122 A1* | 1/2010 | Larson | ............... | H04N 5/23293 348/333.01 |

(Continued)

OTHER PUBLICATIONS

Jones, Charisse, "New App Creates Pop-up Social Networks as Hotels", USA Today, Jan. 25, 2015.*

(Continued)

*Primary Examiner* — Ramy M Osman
(74) *Attorney, Agent, or Firm* — Law Office of Scott C Harris, Inc (57) ABSTRACT

A media sharing system that shares media obtained on cell phones or tablets from many users, who have joined an event. The media can be photos. An event is created based on at least one of a time, location, or some other parameter. Each user to the event uploads their photos from the event, and receives photos from others in the event. Then a composite of multiple different photos is created. This can be done for sports events or hotels.

21 Claims, 5 Drawing Sheets

(56) References Cited

U.S. PATENT DOCUMENTS

| | | | | |
|---|---|---|---|---|
| 2011/0066743 | A1* | 3/2011 | Hurley | H04L 65/4015 709/231 |
| 2011/0142016 | A1* | 6/2011 | Chatterjee | H04L 67/22 370/338 |
| 2011/0161423 | A1* | 6/2011 | Pratt | G06Q 10/06 709/205 |
| 2011/0238755 | A1* | 9/2011 | Khan | G06Q 50/01 709/204 |
| 2012/0239618 | A1* | 9/2012 | Kung | G06F 17/30165 707/621 |
| 2013/0006634 | A1* | 1/2013 | Grokop | G10L 17/10 704/245 |
| 2013/0013595 | A1* | 1/2013 | Tseng | G06F 17/3087 707/723 |
| 2013/0101181 | A1* | 4/2013 | Hsi | G06F 17/30247 382/118 |
| 2013/0124508 | A1* | 5/2013 | Paris | G06F 17/3028 707/723 |
| 2013/0156274 | A1* | 6/2013 | Buchmueller | G06Q 50/01 382/118 |
| 2013/0346564 | A1* | 12/2013 | Warrick | H04L 65/4076 709/219 |
| 2014/0040374 | A1* | 2/2014 | Olsen | H04L 67/18 709/204 |
| 2014/0143380 | A1* | 5/2014 | Warrick | H04L 41/0893 709/217 |
| 2014/0229618 | A1* | 8/2014 | Kumar | H04L 67/1044 709/225 |
| 2015/0006637 | A1* | 1/2015 | Kangas | H04L 67/10 709/204 |
| 2015/0350266 | A1* | 12/2015 | O'Brien | H04L 67/18 709/204 |
| 2015/0356121 | A1* | 12/2015 | Schmelzer | G06F 17/30289 707/803 |
| 2016/0014166 | A1* | 1/2016 | Warrick | H04L 41/0893 370/254 |
| 2017/0105115 | A1* | 4/2017 | Quiros | G06Q 10/02 |

OTHER PUBLICATIONS

Vivion, Nick, "Socializing hotels becomes call-to-arms for Lobby Friends", https://www.tnooz.com, Nov. 21, 2012.*

Cox, Quinn, "4 Ways hotels use social hubs to engage guests", www.tintup.com, Jun. 8, 2014.*

LobbyFriend, lobbyfriend.com, accessed Jul. 3, 2017.*

* cited by examiner

EVENT-BASED MEDIA SHARING

BACKGROUND

Personal devices, such as smart phones and tablets, are often used for taking photographs. In addition to being able to take a photograph at any location, the smart phone can also share the photograph with others, and provide information about the time and date where the photograph was taken.

Different ways of arranging photos on electronic devices are known. The photos can be arranged in terms of "moments", where the different moments represent times and places where the users took photos. Some websites allow sharing photos.

SUMMARY

The present application describes an event-based photo sharing system which acquires photos from many users who have subscribed to events. The photo sharing system then shares those photos acquired from all the different users to all the other different users. In this way, each of a number of users receive photos from the event including the photos they took, and photos that others have taken.

The photo sharing system is based on actions taken from an electronic device. In embodiments, the electronic device can be a smart phone, tablet or other electronic device which has the ability to capture an image.

In embodiments, one or more users create an event which is to be joined by multiple users. Other users join that event. All attendees of the event receive all the photos from all the different event attendees.

These photos can be sorted by a server. The server returns a sorted collection of the photos, referred to herein as a photo album. The photo album can be electronic, or printed and associated with other memorabilia such as cups, mugs and T-shirts.

The events can be defined as preset event parameters. The parameters can include time, day, and/or location.

One preferred embodiment associates the photo sharing app with a hotel, and integrates the joining of the photo sharing event events with the hotels actions to allow user to share the hotel's Internet (Wi-Fi) system.

DETAILED DESCRIPTION

The present application describes a photo sharing software application or "app", which is executed by an electronic device that has picture obtaining capabilities and internet capabilities. While the embodiment describes use on a smart phone, any electronic device such as a tablet PC or the like can be used. The smart phone exchanges information, including photos, with a server by way of running an app in the smart phone. The app can receive a collection of photos from the event, where the collection includes a sorted collection of photos taken by many different users at the event. While this document uses photos as its preferred embodiment, it should be understood that this can also be used for sharing any kind of media, including videos, which can be generically referred to as camera-obtained media, or more simply, "media".

Examples of the events can include, for example a party, wedding, sports outing, amusement park, vacation, hotel stay, or any other kind of occasion that is attended by multiple people.

Conventional photo arranging systems may arrange the photos in terms of "moments". The "moments" are generated based on metadata associated with each photo, such as when have the photos been taken and where the photos were taken. The storage arranges these photos based on that metadata. This can produce, for example, a collection of photos where each "moment" represents photos that were taken either at a location, or on a specific day.

Unlike moments, the "events" described herein allow, and in fact require, that many different people join an event and then all the event members share the photos. The event uses a mobile app that defines the parameters that overall define which photos are included into the event collection. The event defines which photos are included.

Also, anyone who joins the events gets all the event photos from all other event attendees. The users can thus receive photos based on any kind of parameter, not limited to metadata and not limited to photos from a single person or source. Rather than information from the photo, the events use predetermined attributes from many people to add multiple different photos to the event.

One unexpected advantage of this system is that the user receives photos from different vantage points of the different users who have joined the event. Usually, the user takes photos, but those photos will be photos taken by the user, of others. By sending and receiving photos from each person in the event, the user receives not only their own photos, but also photos taken by others which would presumably include photos of themselves.

As described herein, users can also define "sub events" that inherent the attributes from the main event, thus even further ways to view the photo collection.

Figure 1:
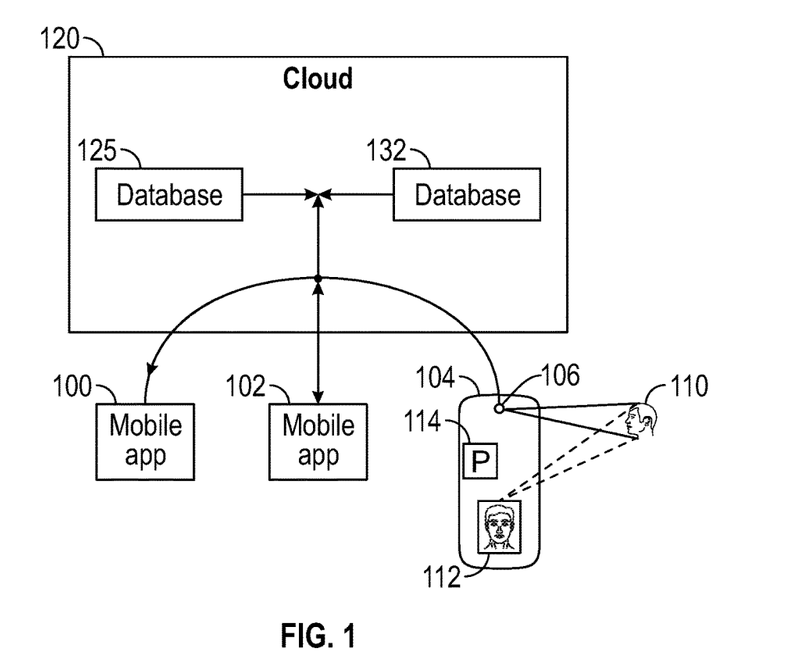
FIG. 1 shows a block diagram of the system communicating between the different computers.

FIG. 1 shows a basic hardware block diagram of the embodiment. There are a number of smart phones 100, 102, 104, which can in general be of different types. Each of the smart phones, however, has a camera shown generically as 106, which can take a picture of a scene shown generically as 110. In most smart phones, the scene will also appear on the screen 112 of the mobile phone. The mobile phone uses a processor shown generically as 114 which runs the different software described herein. As part of the software, photos which are taken, which match the parameter of the predefined event are uploaded to a server 120 which can include a database 125, and/or cloud storage 130. The photos are sorted and handled as described generally herein.

The operations as described herein are described as being carried out with part of the operations being executed on the smart phone or a client, and other parts of the application being executed on a server. This application describes embodiments of the way in which the different computer-based operations are carried out, however it should be understood that different computer operations may be carried out on different ones of the client or server. As described herein, the client can be any smart phone, such as an iPhone, and the server can be leased storage such as on the digital ocean Web server or on any other server.

Figure 2:
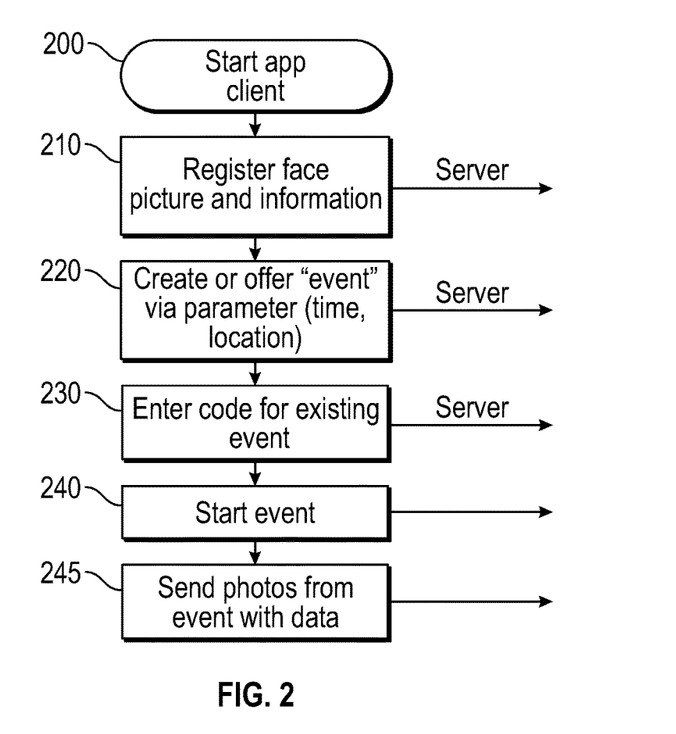
FIG. 2 shows an exemplary flowchart of actions taken on the client computer, for example by a mobile app.
Figure 3:
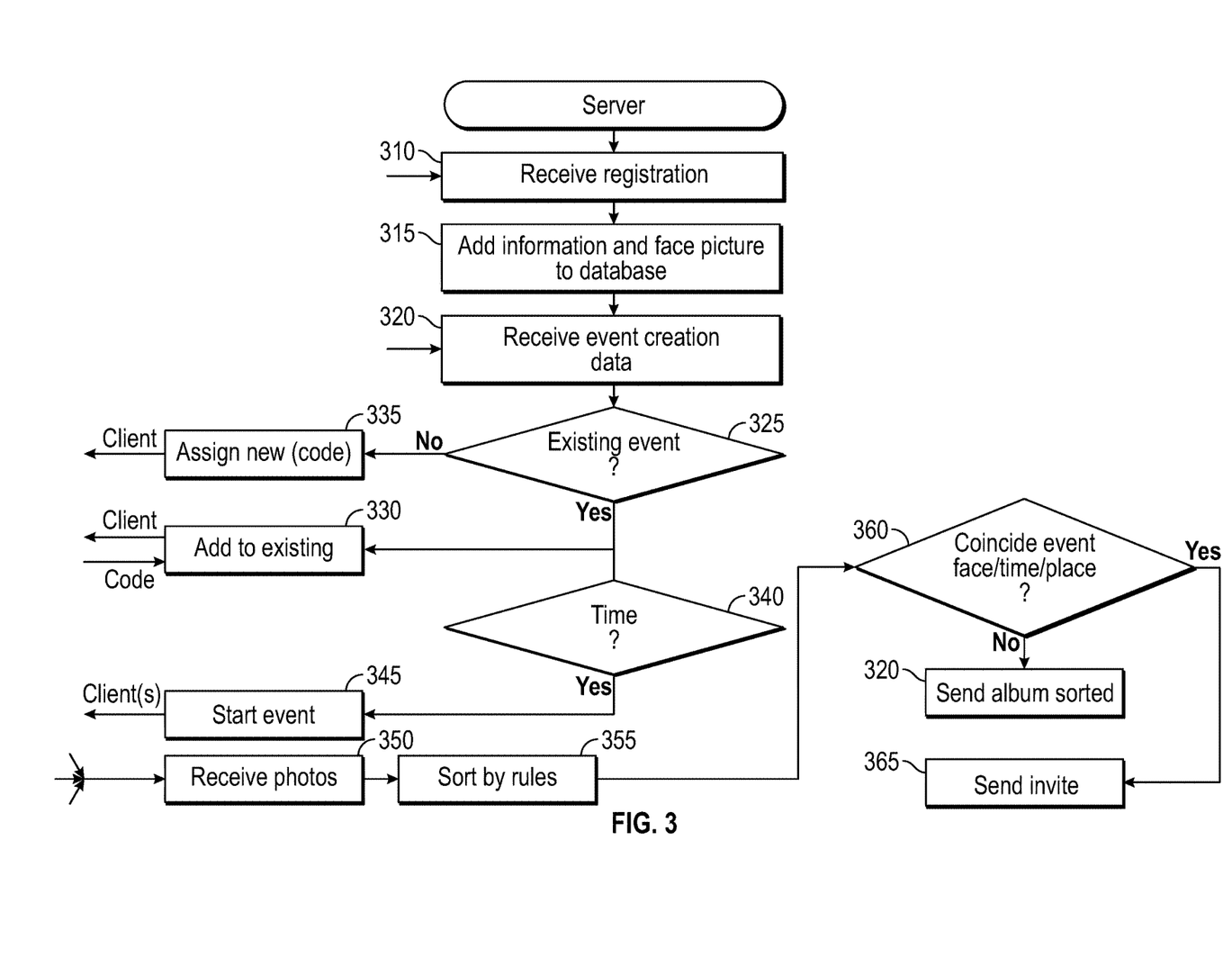
FIG. 3 shows a flowchart of actions taken on the server computer.

FIG. 2 illustrates the actions that are carried out on the client, and how the client communicates with a server. At 200, the app on the client is started. The first time the app is started, the user registers, at 210, by carrying out certain operations including entering their name, creating information, and taking a Selfie of their face. This information is communicated to the server whose operations are shown in FIG. 3.

The server receives this registration at 310, and stores the registration. The server may also send back information indicating for example that the registration the information has been received. The information is added to the server's database at 315, including at least the information about the user, and the face picture. The face picture may be used for facial recognition, and for sorting operations.

Returning to the server's operations, at 220, the user creates or joins an "event". The event is associated with at least one event-defining parameter. For example, the event can be time-based, location-based, annual or based on some other parameter as described herein. An embodiment uses the time-based event as one embodiment, although other embodiments described throughout this patent application describe other examples.

In the time-based event, the event can be a duration of hours in a day, or a number of days, or prespecified hours within a day, or annual for example.

In the time-based event, the user may indicate, for example, that actions on a certain day or days between certain times, for example July 30th between 12 and 5 PM will constitute an event.

The server then receives an instruction that for all users of the event, all of the user photos will be shared with all other attendees of the event. The information about creation of the event at 220 is sent to the server that receives it at 320. At 325 the server determines if this is an already-existing event. Since multiple people will attend an event, the event may already have been created.

If this is found to be an existing event, the user is added to the existing event, at 330. If this is a new event, then this is assigned as a new event at 335. As part of assigning a new event, the user receives a code for the event that the user can send to others in order to allow those others to join the same event.

If the user is joining based on a code, then at 230, the user enters the code for that existing event. In one embodiment, the code can be entered by clicking a link in an email that is sent to the user. Another way of entering the code is by scanning a barcode or QR code or other kind of scannable code from a paper or other kind of invite. By entering the code at 230, the user code is sent to add to the existing operation at 330, in the server. Other ways of entering the event can be used, for example by SMS, short-range communication such as Bluetooth, NFC or other ways of allowing the user to receive information from a server.

More generally, however, the code to enter the event can be any identifier that allows a user to join an already created event, including the event joining techniques described herein. In one embodiment, the event creator can configure the event such that the event creator must approve all non-invitees. In this embodiment, certain users can be invited, and other users can join only after being approved by the event creator. In this way, the creator gets to decide which users can join the event.

At the time of the event, at 340, the server begins the event, by sending a message at 345 to all of the different clients who are involved with the event. The client receives this message at 240, which is sent to and causes sending of all pictures taken (which match to the event) to the server at 245. The server receives these photos at 350 from a number of different clients. When a user joins an event, that event's information is registered locally on the device. This ensures that photos taken are identified and queued for upload, as described herein, even if the device is at the time not connected to the internet.

The server may also sort the photos at 355, according to rules. Different rules can be used. One of the rules uses facial recognition to sort the photos. In one embodiment, members of the photo sharing app have uploaded pictures of their faces to the app, and facial recognition can be used to sort those pictures to find which of the users is associated with the faces. Since this is from a constrained group, it may be a more simplified facial recognition.

Other sorting can also be done, e.g., based on "subevents" defined by the user, e.g., specific times of the event (e.g., lunch from 12-1, or the pool subevent for all people whose location is detected to be the pool).

Other sources of faces can also be used to assist in sorting the photos. For example, social networks such as Facebook may have databases of faces that can be used to help sort the pictures. In one embodiment, the people are sorted into being identified and unidentified people. The identified people may be members of the event, or maybe others who can be identified and invited to the event if desired. The background of the picture can also be sorted, using either location or background identification.

An image processing step can also be carried out to automatically adjust brightness, coloring and straightening of the images. Also, if there is an image that is obviously a bad image (for example an image of the floor or an overly blurry image) this image can be removed automatically, or marked for later removal.

At 360, a coinciding event is found. The coinciding event means that a user is "found" at the event, but has not subscribed to the event. For example, a known user's face can be found in the pictures for the event, where that known user has not signed up for the event. When this is found, that known user is sent an invite at 365.

Another way in which this can be found is when a known user's smart phone is found to be in the place of an event at the time of an event, e.g., a user who has downloaded the app, and is at the event at the time and place of the event. Again, any of these coinciding events can trigger an automatic send of an invitation, or a message to the event organizer suggesting that the event organizer might want to invite these people to the event.

A sorted picture "album", which may be any kind of collection of pictures, either on paper or electronic, is created by the computer operations, and sent to the user which may be sent for example by a link or the like. The picture album in one embodiment may be immediately viewable by all event participants. The event participants can also invite others to view those event photos, by any kind of electronic message, or by sending a special event code to those nonparticipants. For the embodiment where videos or other media are obtained, the picture album may contain a thumbnail of the video, which can be selected to view the video, or can contain a series of still pictures showing keyframes in the video.

In other embodiments, the photo album can be transferred to or otherwise accessible via a kiosk, which can for example be located in a hotel lobby or in a store. The user can enter a unique code into the kiosk in order to view the photo album and print one or more of the photos, or the user can use their login credentials from the app to access the photos.

Figure 4:
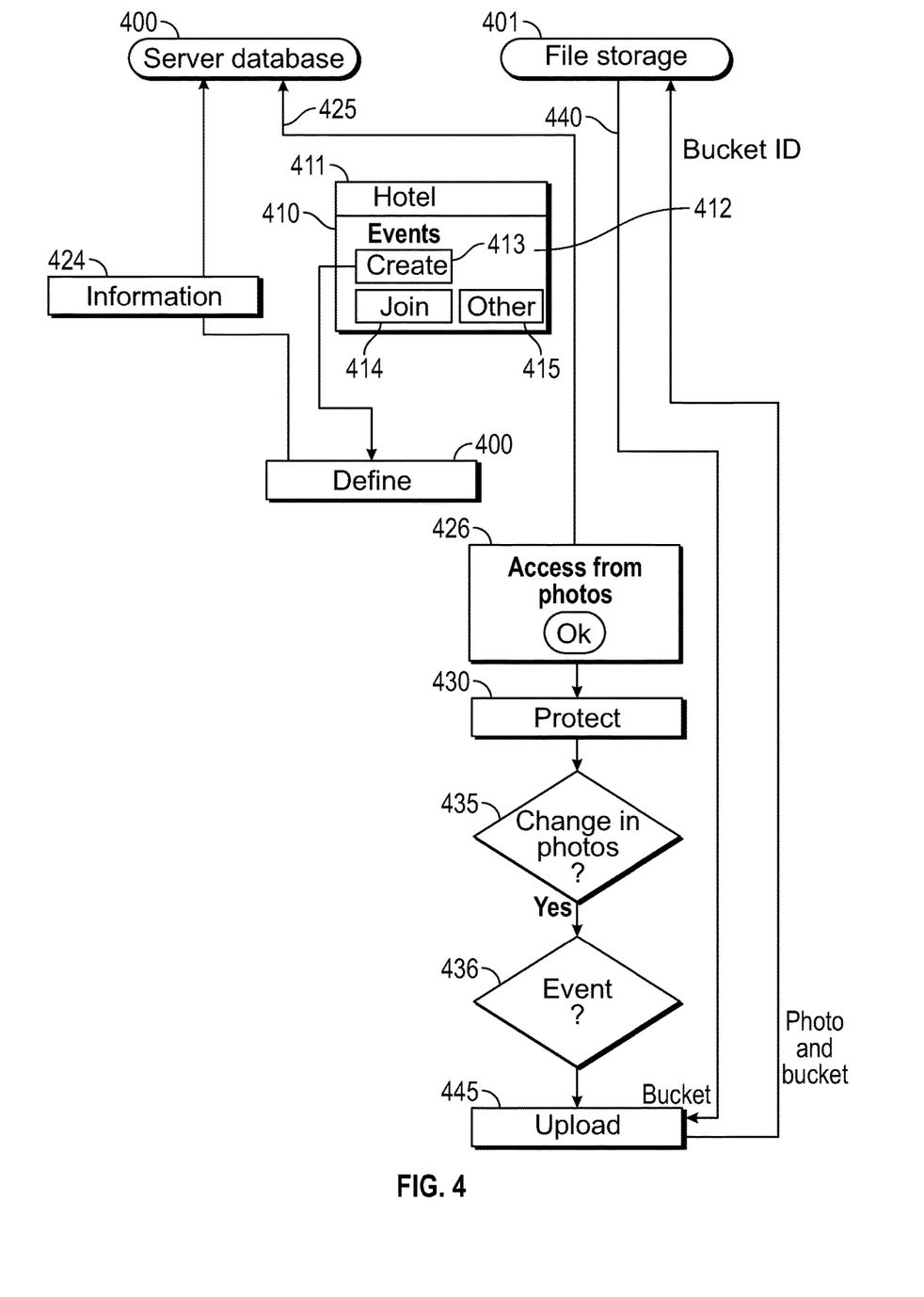
FIG. 4 illustrates a flowchart of operation specific to the event occurring in a hotel environment.

One embodiment uses this system as part of a hotel operation. In a hotel environment, hotel guests and visitors are often given access to the hotel's Wi-Fi. The inventors recognize that this produces an opportunity to allow people to define either part or all of their hotel stay as an event that is occurring at the hotel. For example, one such event could be "my Hawaii vacation". In that example, all the members of the user's family or vacation party could be invitees to the event. An embodiment which is specific to the hotel event is illustrated in FIG. 4.

In this embodiment, there can be a server 400 which connects via the Internet to a file storage 401. Both of these can be cloud-based databases. In this embodiment, the user may be given a more limited event screen illustrated as 410. In 410, the hotel information 411 may take up part of the screen, while the events 412 take the rest of the screen. The user is given the choice to create an event at 413, or to join an event at 414. This simplified user interface can facilitate the user either creating or joining an event.

The user may also choose to do further information with the other buttons 415, which may enable the user for example to edit an existing event, or carry out some of the other functions described throughout this specification.

If the user selects creating an event at 413, this brings up the define process at 420. The define process at 420 requires the user to fill in the title of the event, the start time of the event, and the duration of the event. This is sufficient to define the event. The information about this event is then sent to the server 400 as information 421. The information 421 may include a unique identifier of the mobile device, such as its UUID (Universal unique identifier) indicating the mobile device. The server, upon recognizing a new event, sends back information to the mobile device at 425, asking for access to the photos on the mobile device at 426. Providing access to the photos initiates a protocol at 430, which requires the mobile device to instruct the app every time the photo collection changes. This is basically a subscription protocol, started when the user grants access to the photos to the running app.

The application's logic operates to validate if a recent addition, update or deletion has occurred with an object that has been pre-defined to be a part of the event. If the addition's attributes are within the event's duration, the object is added. Any time there is a change in the photo collection detected at 435, the file storage is triggered using a bucket ID 442 which describes which file storage bucket the photo should be placed in. The bucket ID is used as the address to cause the app to upload the new photo at 445 to the file storage 401. The trigger that causes the upload can be either the app itself shown as 436, or the server sending the bucket id to the app which forwards it to the storage. In this way, any time there is a change in the photo collection when the parameter matches that of the event, the photo(s) are uploaded.

In an alternative embodiment, any device that gets added to the hotel's Wi-Fi can automatically be enrolled in an event during their entire stay at the hotel. In this embodiment, the Wi-Fi communicating system may automatically determine the time period of the user's stay at the hotel, and ask the user if they want to join an event while they are at the hotel.

For example, joining the hotel's Wi-Fi usually requires the user's last name and room number. By entering the last name and room number, every member of the user's party (everyone associated with that room or rooms) can become part of the same event. It may be necessary for the user to agree to join the event, and it may also be necessary for the user to agree to share their photos before they can become part of this event. Similarly, users who are at the hotel for a convention or other type meeting at the hotel can be automatically enrolled in the event and check into the event.

Figure 5:
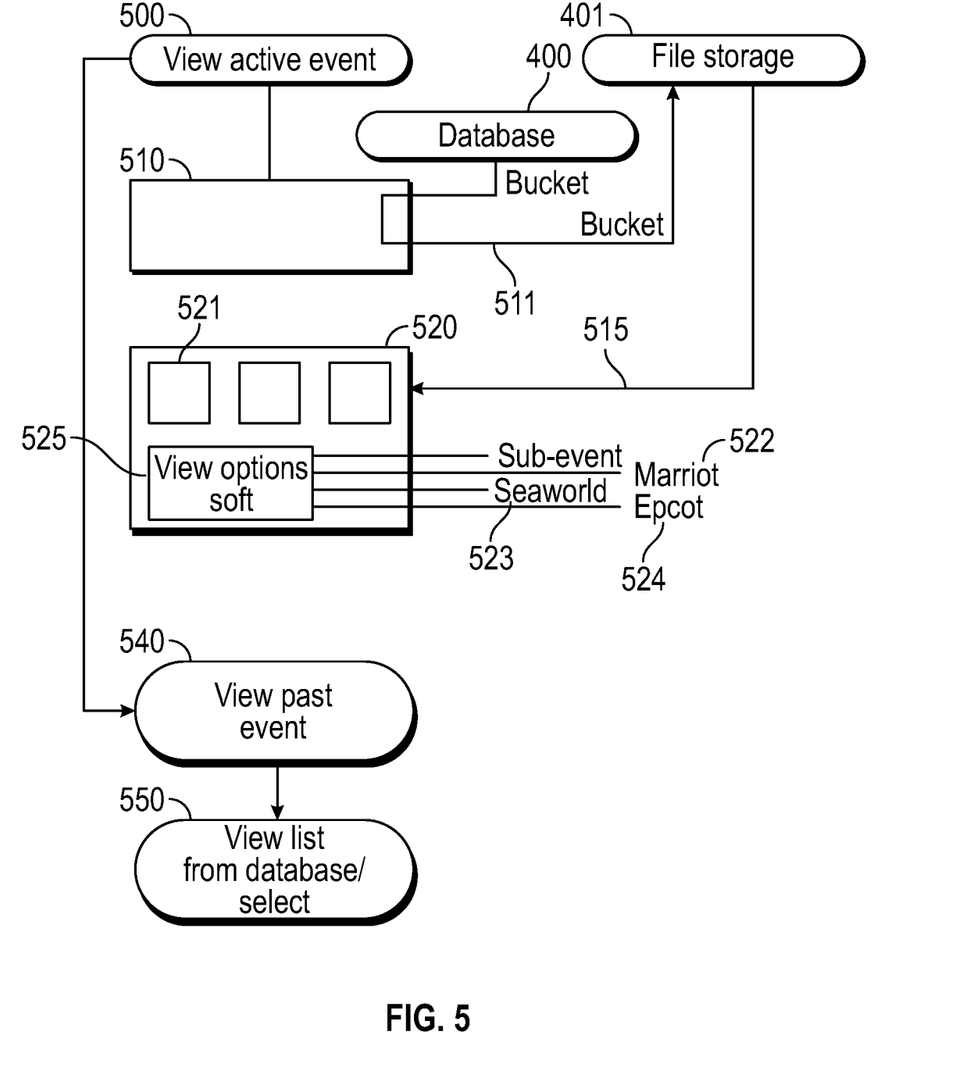
FIG. 5 illustrates receiving information by a user, from an event.

FIG. 5 illustrates how devices may view the active event. The user selects to view the active event by sending a message to the database 400 indicating their desire. The database 400 then returns a bucket ID to the mobile device at 510 which sends this bucket ID at 511 to the file storage device 401. The file storage device 401 responds to the bucket ID by returning the pictures at 515 to the mobile device, which displays those pictures as shown as 520, 520, for example, shows a number of thumbnails showing the pictures in the current event.

The user can also narrow down the set of pictures by selecting subevents 522. In the example previously given of the event being "my Hawaii vacation" one of the subevents may be "my time at Marriott". Another sub event may be "Sea world" at 523. Yet another sub event may be a different place such as Epcot at 524. Choosing any of these sub events may use an item of metadata to sort the photos associated with that bucket ID. In one embodiment, for example, that metadata can cause only certain ones of the photos to be returned. For example, the file storage can sort through the photos associated with that bucket ID to return only some subset of those photos. In another embodiment, the entire set of photos can be returned, and the app running on the user's device can sort according to metadata. The sub events can narrow down the files which are received, so that the user can receive a more relevant set of photos in this way. In any of these collections, the user also gets view options shown generally as 525. The view options may include being able to sort by time, location, or face. For example, the user may select to see only pictures that were taken between 1 PM and 2 PM, or only pictures that include the current user's face in them.

While the above described sorting by metadata, the sorting can also be carried out by sorting using photo contents.

The user can also view some other event, such as a past event at 540. By requesting this, the database can return a list of the different past events at 550, and the user can select one of these past events, select them which provides a bucket ID that is sent to the file storage to return the pictures from that past event.

Figure 6:
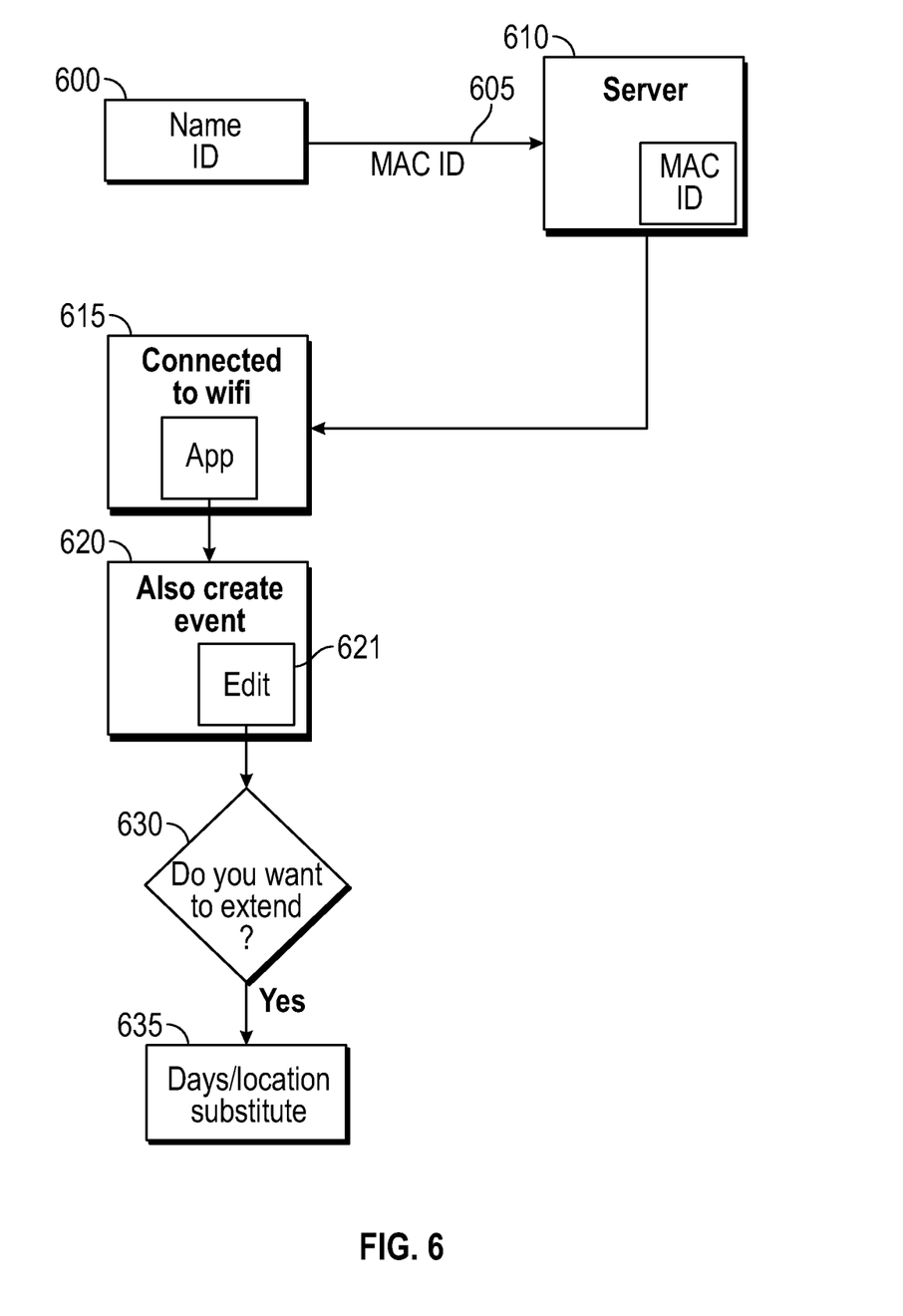
FIG. 6 illustrates the way in which a user in a hotel environment can automatically create or join an existing event.

An embodiment which is specific to the hotel environment and provides further details on how the events can be created and monitored in the hotel environment, is shown in FIG. 6. At 600, the user is asked to log into the hotel Wi-Fi, by adding their name and typically an ID, which can be the room number, or can be a code which was given to the user by the hotel. This is information is sent to the hotel server 610 at 605, along with the MAC address of the computer that requested the access. The server returns authorization to the computer to connect, and stores the MAC address as an authorized hotel Wi-Fi user. The information returned usually indicates that the user is connected to Wi-Fi. This embodiment may also include a link 615 suggesting the user to download the hotel specific app to get additional information. For example, users who download the app may receive better Wi-Fi speeds, or may get a free drink coupon, or something else. When the user downloads the app, the app may auto create an event for the time of the stay at 620. The user receives the ability to edit the event at 621. One way of editing the event may be if the stay extends between multiple hotels. Therefore, the edit at 625 may queries the user about whether they want to extend the event and if so, questions them about how many days, or a new location, or some other parameter, at 635. For example, the user can extend their stay to a second hotel.

In the hotel scenario, there can be additional embodiments, some of which can be tailored to attempt to entice users to download the hotel-specific app. In one embodiment, the user may be attending an event such as a wedding at the hotel. The wedding may be associated with an event name and/or passcode to join the event. The event name may be as simple as Bob and Marsha's wedding. The passcode may be communicated to the users, e.g., on the event invite, or may be publicly posted for example on a sign directing the users towards the event location. When the user reaches the location of the event, the user can automatically join the event. Participants who do not already have the appropriate application on their phone can be directed to the app store to download the application, or can be given a link in some operating systems which can be simply selected to join the app.

In one embodiment, the electronic calendar invite can include information that not only includes the application information into the electronic calendar, but also includes electronic information which includes the photo sharing event in the photo sharing app. This puts the user into the event or directs them to download the event.

In another embodiment, each event can be associated with its own unique SSID for the wifi, that uniquely identifies the event. For example, Bob and Marsha's wedding can be used as the SSID name. Users can search for SSIDs and find one whos name uniquely describes the event. When the user joins the Wi-Fi for that SSID, there can be a gateway app for the SSID that automatically redirects the joiners to a special network that is part of the event. Again there can also be a password, which can be posted at the event, or this can be an open wifi system. The gateway app in one embodiment can require a user to enter their name, so that the computer system can keep track of who has joined each event. Alternatively, users who have already registered with the application can have that registration information used to track them or their progress in the event.

In one embodiment, location detecting equipment, such as Bluetooth beacons, can be used to track each registered user's location. The user's location can be specifically noted by the Bluetooth beacon, and only those users who are actually in the area of the wedding, or other type event can be allowed to join the private SSID.

In one embodiment, the application can have location sensitive capabilities, and can provide proximity-based reminders. For example, for an ongoing event, the user can be reminded that they are scheduled to join the event, when they come into the area of the event. When the user walks into the hotel, the running app can automatically sense their location in the hotel. The app can push a message to the user who has walked into the hotel to remind or guide the user about a specific location of their event.

In another embodiment, the hotel bulletin board or other written message device can provide a scannable code that when scanned can enable the user to join the event. In some embodiments, each joiner to the event must have an invite from the authorized user or be approved by the authorized user. This allows the host organizers to prevent unauthorized users from receiving photos to the event. In another embodiment, the approval can be implied by the user being detected to be in a proper location within the room.

In many of these embodiments, precision pinpointing of the location can be used to assist in determining the content of the photos and whether the photos or videos should be shared with others. This can use a beacon such as a Bluetooth beacon to track the user. The app may obtain the users' consent to be tracked for these purposes.

The tracking of the user can assist in getting information for the event, including the photo sharing described herein. However, by getting the consent from the users to track them, other powerful information can be obtained that is unrelated to the photo sharing. For example, during events, the number of users at the event at any time can be determined or estimated. Even if only a percentage of users have the app, by knowing which of those users are still at the event at any time, a statistical model of all the users can be implied. This can tell the hotel how much air-conditioning to put into a particular room, and how much service is still needed to the room.

The event organizer can also specify areas from which photo sharing is carried out and other areas where the photo sharing is not be carried out. For example, the event organizer can specify private areas from which photos are not shared, such as dressing rooms and parking lots.

The event organizer can also specify non-reciprocal sharing locations, that is where the event organizer receives pictures that are taken, but others do not. For example, the event organizer may want to receive, and possibly approve, wedding ceremony photos of themselves, but not share those with everybody else, or at least not until approved by the event organizer.

At any time during the event, or after the event, the user can select either a time or a location to be a sub event, as described above.

The user can also pause the event, for any amount of time that the user may decide that they do not want their photos to enter the event. For example, during a working vacation the user may pause their event during the working part of the events. This pause can be a toggle, or can be for a specified time period, for example.

sporting events such as basketball, baseball, NASCAR and others. In this embodiment, users can create events based on the team schedule. In one embodiment, the app can be integrated into an application associated with the professional sports team, such as the major league baseball app. In this embodiment, when the user is at a major league baseball event, as detected by the home game schedule and the location of the user, user photos are automatically associated with the event when the user attends the event.

In this embodiment, fans or attendees to real life event can join the event and can specify parts of the event to which they want to subscribe. Using the event example of NASCAR, users can subscribe to one specific driver, for example driver number 48. In baseball or football or soccer embodiments, users can similarly subscribe to a player number, or a specific team, or to any other criterion.

In this embodiment, the user might join or follow driver number 48 for a specific race e.g. the Daytona 500. When following this driver, the event becomes 'all pictures taken by all parties which includes pictures of driver number 48'.

The pictures including driver number 48 can be identified in a number of different ways. In one embodiment, people or objects in the photos can be tagged by either the user who took the photo, or by some other person.

The photos can also be automatically processed, using image processing software to look for the number 48 on the photo, or to look for identifying criteria of the car associated with driver 48 in the photo. For example if number 48 is a red Ferrari with specified kinds of markings on it, then the image processing software can look for those markings and identify the automobile from those markings. In a team sports embodiment, the image processing software can use biometric identification, such as height and body size of the player in order to identify the player of interest.

In yet another embodiment, a designated person such as an event coordinator, can manual identify the auto in the photos. This can also be done by a fan who receives the photos.

In yet another embodiment, the location from which the photo was taken can be determined, and can be coordinated with the time at which it is taken. For example, this can be done using Bluetooth beacons to determine the location of the user who took the photo. Then, the time at which the photo was taken can be determined, with great specificity. The time can be coordinated by the central computer system with the automobiles that should have been in field-of-view at that time. In this way, the content of the photos taken can be coordinated with the photos automatically based on the position in time.

The photos can be taken by people were attending the events, but can also be taken by for example the driver or staff associated with the driver. For example, the photos can be taken in the pits when servicing the car number associated with driver number 48, or getting the car ready to put it into the initial race.

An advantage of this system is that users can see pictures of their desired item, even when that desired item is not necessarily in a location where users in the stands or anywhere else could see it.

Moreover, when there are many cars in the race, the user may only be interested in one of those cars, however it would be impractical to televise or otherwise make available all of the behind-the-scenes operations for all of the cars to all people. By subscribing to only one of these cars, the user can see only pictures or videos from that only one.

The beacons can also be used in the sporting events to determine where people are congregating, to provide information to help the promoters later on or to decide good locations for concessions This also gives users a way to organize their photos. For example a season-ticket holder can organize their photos, e.g., an automatically created photo book for a season. Any other grouping of photos can be made in analogous ways.

Example groups might include, for example all home or away games for a team; groups which are set via geofencing (for example all professional sports games in a specified geo-fence area) and extensions on that. In one embodiment, for example, the user can specify a geographic area such as San Diego. Then, the user can specify that they want to join all events for home games, or for all games, in which latter case the fan would join the events for all the home games for the sports team and also for its away games. Other embodiments describe new ways of defining the events and/or the members of the events. One particularly preferred embodiment automatically creates events based on triggers. The triggers can be proximity to groups of people who are defined in advance. The people are defined in terms of a group, for example family members or friends. In this embodiment, the group may be formed by setting multiple different members of the group. For the family embodiment, a group may have any number of members and may be formed of a user's family e.g. everyone in the family or the extended family. It can also be formed of a group of friends.

Triggers can be set when more than a specified number of the group members are together in the same or similar location. For example whenever two members of the family are together, an automatic event may be created causing both members of the family's pictures to upload to the storage and be shared with the other people in the group. Alternatively, the users can set the threshold for the trigger. Two members together may not be a unique enough event, since husband-and-wife may always be together. However, when four members of the family are together or five members of the family are together this could automatically trigger the upload.

This can also be based on any other criteria of this type.

In one embodiment, the group can be all of the users friends on a social network such as Facebook™. Whenever five members of the user's friends on the social network are determined to be within 1000 feet of one another by geofencing or by any other location detecting technique, an event can be automatically created, thus triggering the automatic photo sharing between all members of the event. As in all the other embodiments, options can be set to choose the number five to some other number. In this way, the event is automatically created when a specified number of people from a specified group are determined to be in the same location.

Another embodiment can automatically create invites to the event from another application such as a fitness app. This embodiment can set a location which rather than a fixed location is a location that is continually moving, for example. In the fitness app embodiment, users may be on a run or on a bike ride. However, when the users are within a predetermined distance of a number of other users for a predetermined time, than those other users become part of the event. This event can then work back to the beginning of the time that the users were at the same location to automatically photo share with other members of this event. This event is called a moving event, because it is defined in terms of proximity to other users, rather than defined in terms of proximity to a fixed event.

In all of these embodiments, one option is for each user to approve their uploaded photos prior to allowing those photos to be shared with others. In one embodiment all photos may be shared, but in another embodiment the user must approve that sharing before it is shared. In this way, the user can prevent embarrassing photos or the like from being shared with others.

Another embodiment automatically enrolls the user into an event when the user attempts to connect to any public Wi-Fi system. More generally, when users request network access such as Wi-Fi access, often there is a gateway application which is run by the Wi-Fi provider, which requires the user to agree to terms of service in order to obtain the network application. This is the case For example, when a user receives the public Wi-Fi from a public place such as a restaurant, which usually involves agreeing to the terms of service for the Wi-Fi. The terms of service can automatically include that the user agrees to be part of an event, in one embodiment. In another embodiment, the user is asked to agree to the event terms and decide to accept or decline joining the event while they are connected to that Wi-Fi. In this way, the user can join a Wi-Fi in an a restaurant or bar, and automatically be enrolled in the event in that restaurant or bar for the time. While they are connected to the Wi-Fi.

Although only a few embodiments have been disclosed in detail above, other embodiments are possible and the inventors intend these to be encompassed within this specification. The specification describes certain technological solutions to solve the technical problems that are described expressly and inherently in this application. This disclosure describes embodiments, and the claims are intended to cover any modification or alternative or generalization of these embodiments which might be predictable to a person having ordinary skill in the art. For example, other kinds of ways can be used to invite people into the event, and other kinds of identifiers can be used within the computer system.

The communication which is done herein can be done by Wi-Fi as described, but can also be done by Bluetooth or NFC or any other communication protocol. Bluetooth or NFC waypoints can also be used as a place where users who either visit or take a photo near one of these locations will see that photo or set of photos included in a sub event.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of computer data from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

Functions can also be carried out by programmed computer readable media which can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other Internet aware device. Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A photo sharing system, comprising:
a computer running a program that creates a camera-obtained media sharing event in a hotel and allows remote computers to join an existing camera-obtained media sharing event,
wherein the camera obtained media sharing event is created from information which is received into the computer from a gateway application that provides access to wifi network resources in the hotel, where the gateway application provides a choice to the user to create or join an event, and where the user selecting to create or join the event provides information automatically about a time period of the user's stay at the hotel based on the user's hotel information, and automatically creates the event for the time period of the user's stay at the hotel;
said computer automatically examining camera-obtained media, and determining if said camera-obtained media was created during the time of the user's stay at the hotel and defining camera-obtained media created during the time of the user's stay at the hotel as camera-obtained media associated with the event and sending those camera-obtained media to a file storage,
and said computer receiving camera-obtained media from the file storage which were sent by other users associated with the event during the user's stay at the hotel;
said computer providing displays of camera-obtained media associated with the event, including both camera-obtained media taken by the user and camera-obtained media taken by other users, during the user's stay at the hotel, where both the camera-obtained media taken by the user and the camera-obtained media taken by other users during the user's stay at the hotel are part of the display of camera-obtained media wherein the event is also defined over an area, and further comprising a location tracking device that tracks a position of the user in the hotel, said computer automatically examining said camera-obtained media, and determining, in addition to determining if said camera-obtained media was created during the time of the user's stay at the hotel, also determining if the camera obtained media was created within said area by user the location of the user determined from said location tracking device, and defining camera-obtained media created during the time of the user's stay at the hotel and within the area, as camera-obtained media associated with the event and sending those camera-obtained media to the file storage,
the computer determining if a location of the user, obtained from the location tracking device, is within a private area, within the area, where media from the private area is not shared even though the private area is within the area of the event,
and the computer determining first media that is part of the event as determined by said camera-obtained media being created during the time of the user's stay at the hotel, also determining that the camera obtained media being created within said area, and determining that the location of a first computer that obtained the first media is not within a private area,
and the computer determining second media that is not part of the event as determined by said camera-obtained media being created during the time of the user's stay at the hotel, also determining that the camera obtained media being created within said area, and determining that the location of a first computer that obtained the first media is within a private area,
and sharing the first media with other computers, and the computer not sharing the second media with other computers.

2. The system as in claim 1, where said computer is a portable computer with a camera therein, that obtains said camera-based media.

3. The system as in claim 1, where said camera-based media are photos.

4. The system as in claim 1, wherein the computer sends invitation messages to other users who will be part of the event.

5. The system as in claim 1 wherein the user staying at the hotel becomes the event organizer, the computer receives a request from another user to join the event, and where the event organizer, must agree to the other user joining the event prior to the other user being allowed to join the event and send and receive camera-based media.

6. The system as in claim 1, wherein the gateway application receives identifying information about the user in order to connect the user to the hotel's Wi-Fi including at least the user's name and room number, and uses said identifying information to determine the length of the stay.

7. The system as in claim 6, wherein the gateway application receives identifying information about the user in order to connect the user to the hotel's Wi-Fi and uses said identifying information to determine the length of the stay.

8. The system as in claim 7, wherein the length of stay is a time of a user's hotel reservation.

9. The system as in claim 7, wherein the length of stay is a time of a meeting at the hotel.

10. The system as in claim 1, wherein the first information comprises a joining of a wifi network which is specific to the event, and is named with a name associated with the event.

11. A computer system, comprising:
a computer running a program that shares camera-obtained media with others and receives camera-obtained media from others, by creating camera-obtained media events, allowing other computers to join the events,
said camera-obtained media events having a first parameter that defines the event and defines which media obtained by other computers become part of the event, where the event extends over an area,
a tracking system that tracks locations of the other computers,
the computer determining if a location of a computer is within a private area within the area, where media is not shared from the private area even though the private area is within the area of the event,
and the computer receiving first media that is part of the event as determined by the first parameter, if the computer determines that the location of a first computer that obtained the first media is not within a private area, and sharing the first media with other computers, and the computer not sharing the first media if the computer determines that the location of the first computer that obtained the first media is within the private area, and is within the area of the event,
wherein the event is created from information which is received into the computer from a gateway application that provides access to wifi network resources in the hotel, where the gateway application provides a choice to the user to create or join an event, and where the user selecting to create or join the event provides information automatically about a time period of the user's stay at the hotel based on the user's hotel information,
wherein the private area includes specific rooms within the hotel.

12. The system as in claim 11, where said camera-based media include photos.

13. The system as in claim 11, wherein the first parameter includes a specific location, and media obtained at the specific location are received as said first media.

14. The system as in claim 11, wherein the first parameter includes a specific wifi SSID, and media obtained while connected to the specific SSID are received as said first media, and media obtained by others who are connected to the specific SSID are received as said second media.

15. The system as in claim 11, wherein the first parameter identifies a specific player in a sports event, and the media includes only media which includes the specific player in the sports event, taken by the user and also by other users who have joined the event.

16. A computer system, comprising:
a computer running a program that shares camera-obtained media with others and receives camera-obtained media from others, by creating camera-obtained media events, allowing other computers to join the events,
said camera-obtained media events having a first parameter that defines the event and defines which media obtained by other computers become part of the event, where the event extends over an area,
a tracking system that tracks locations of the other computers,
the computer determining if a location of a computer is within a private area within the area, where media is not shared from the private area even though the private area is within the area of the event,
and the computer receiving first media that is part of the event as determined by the first parameter, if the computer determines that the location of a first computer that obtained the first media is not within a private area, and sharing the first media with other computers, and the computer not sharing the first media if the computer determines that the location of the first computer that obtained the first media is within the private area, and is within the area of the event, wherein the event is in a hotel, wherein the event is created from information which is received into the computer from a gateway application that provides access to wifi network resources in the hotel, where the gateway application provides a choice to the user to create or join an event, and where the user selecting to create or join the event provides information automatically about a time period of the user's stay at the hotel based on the user's hotel information, and automatically creates the event for the time period of the user's stay at the hotel, where the first parameter includes the time period for the user's stay at the hotel wherein the tracking system uses a wireless location beacon to track the users.

17. A photo sharing method, comprising:
running a program on a computer that creates a camera-obtained media sharing event in a hotel and allows computers to join an existing camera-obtained media sharing event,
said media sharing event based on a information which is received into the computer from a gateway application that provides access to wifi network resources in the hotel, where the gateway application provides a choice to the user to create or join an event, and where the user selecting to create or join the event provides information automatically about a time period of the user's stay at the hotel based on the user's hotel information, and automatically creates the event for the time period of the user's stay at the hotel;

determining that first media were created during the user's stay at the hotel, and and uploading said first media to a file storage, and said computer receiving second media from the file storage which were sent by other users associated with the event and which were created during the user's stay at the hotel, and providing displays to the user of both the first media obtained by the first user that were created during the user's stay at the hotel, and the second media obtained by other users that were created during the user's stay at the hotel     providing displays of camera-obtained media associated with the event, including both camera-obtained media taken by the user and camera-obtained media taken by other users, during the user's stay at the hotel,     where both the camera-obtained media taken by the user and the camera-obtained media taken by other users during the user's stay at the hotel are part of the display of camera-obtained media wherein the event is also defined over an area, and further comprising a location tracking device that tracks a position of the user in the hotel,     automatically examining said camera-obtained media, and determining, in addition to determining if said camera-obtained media was created during the time of the user's stay at the hotel, also determining if the camera obtained media was created within said area by user the location of the user determined from said location tracking device, and defining camera-obtained media created during the time of the user's stay at the hotel and within the area, as camera-obtained media associated with the event and sending those camera-obtained media to the file storage;

determining if a location of the user, obtained from the location tracking device, is within a private area, within the area, where media from the private area is not shared even though the private area is within the area of the event, and determining first media that is part of the event as determined by said camera-obtained media being created during the time of the user's stay at the hotel, also determining that the camera obtained media being created within said area, and determining that the location of a first computer that obtained the first media is not within a private area, and determining second media that is not part of the event as determined by said camera-obtained media being created during the time of the user's stay at the hotel, also determining that the camera obtained media being created within said area, and determining that the location of a first computer that obtained the first media is within a private area, and sharing the first media with other computers, and the computer not sharing the second media with other computers.

18. The method as in claim 17, wherein the event is also defined over an area, and said computer automatically examining said camera-obtained media, and determining, in addition to determining if said camera-obtained media was created during the time of the user's stay at the hotel, also determining if the camera obtained media was created within said area, and defining camera-obtained media created during the time of the user's stay at the hotel and within the area, as camera-obtained media associated with the event and sending those camera-obtained media to the file storage.

19. The method as in claim 18, further comprising a wireless location beacon forming a tracking system that tracks locations of the users,     the computer determining if a location of a user is within a private area, within the area, where media is not shared from the private area even though the private area is within the area of the event,     and the computer determining first media that is part of the event as determined by said camera-obtained media being created during the time of the user's stay at the hotel, also determining that the camera obtained media being created within said area, and determining that the location of a first computer that obtained the first media is not within a private area,     and the computer determining second media that is not part of the event as determined by said camera-obtained media being created during the time of the user's stay at the hotel, also determining that the camera obtained media being created within said area, and determining that the location of a first computer that obtained the first media is within a private area,     and sharing the first media with other computers, and the computer not sharing the second media with other computers.

20. The method as in claim 17, wherein the first parameter includes a specific wifi SSID, and media obtained while connected to the specific SSID are sent as said first media, and media obtained by others who are connected to the specific SSID are received as said second media.

21. The method as in claim 17, wherein the gateway application receives identifying information about the user in order to connect the user to the hotel's Wi-Fi including at least the user's name and room number, and uses said identifying information to determine the length of the stay.

* * * * *